(12) United States Patent
Temme et al.

(10) Patent No.: US 11,862,946 B2
(45) Date of Patent: Jan. 2, 2024

(54) BUS BAR SYSTEM WITH AT LEAST ONE BUS BAR HELD IN A CONTACT PROTECTION HOUSING

(71) Applicant: RITTAL GMBH & CO. KG, Herborn (DE)

(72) Inventors: Stefan Temme, Sinn-Fleisbach (DE); Andreas Bastian, Dillenburg (DE); Ann-Sylvia Jakob, Schöffengrund (DE); Jörg Kayma, Herborn (DE); Jörg Kreiling, Herborn-Burg (DE)

(73) Assignee: RITTAL GMBH & CO. KG

( * ) Notice: Subject to any disclaimer, the term of this patent is extended or adjusted under 35 U.S.C. 154(b) by 160 days.

(21) Appl. No.: 17/602,833

(22) PCT Filed: Mar. 30, 2020

(86) PCT No.: PCT/DE2020/100257
§ 371 (c)(1),
(2) Date: Oct. 11, 2021

(87) PCT Pub. No.: WO2020/207531
PCT Pub. Date: Oct. 15, 2020

(65) Prior Publication Data
US 2022/0149599 A1  May 12, 2022

(30) Foreign Application Priority Data

Apr. 11, 2019 (DE) .................. 10 2019 109 629.4

(51) Int. Cl.
*H02B 1/06* (2006.01)
*H02B 1/056* (2006.01)
*H02B 1/20* (2006.01)
*H02B 1/14* (2006.01)
*H02G 5/00* (2006.01)

(52) U.S. Cl.
CPC ............. *H02B 1/06* (2013.01); *H02B 1/0565* (2013.01); *H02B 1/14* (2013.01); *H02B 1/20* (2013.01); *H02G 5/00* (2013.01)

(58) Field of Classification Search
None
See application file for complete search history.

(56) References Cited

U.S. PATENT DOCUMENTS 5,337,211 A * 8/1994 Reiner .................. H02B 1/056
439/574
7,791,863 B2  9/2010 Strackbein et al.
(Continued)

FOREIGN PATENT DOCUMENTS

DE   202005017650 U1   1/2006
EP        0753916 A2 *  1/1997  ........... H02B 1/0565
(Continued)

OTHER PUBLICATIONS

International Search Report (in English and German) and Written Opinion of the ISA (in German) issued in PCT/DE2020/100257, dated Jun. 12, 2020; ISA/EP.
(Continued)

*Primary Examiner* — Courtney L Smith
(74) *Attorney, Agent, or Firm* — Harness, Dickey & Pierce, P.L.C.

(57) ABSTRACT

A bus bar system having at least one bus bar which is accommodated in a contact-protection housing in a contact-protection manner and in an accessible manner via contacting passages for electrical devices and/or device adapters, the contact-protection housing having a lower part and an upper part which is detachably fixed on the lower part and between which the at least one bus bar is held, wherein the upper part has, on its side facing the lower part, a plurality of plug-in receptacles extending from the latter into the lower part, and the lower part has at least one slide with at
(Continued)

least one latching pawl which can be adjusted between a locking position, in which the at least one latching pawl engages in the plug-in receptacle, and a release position, in which the at least one latching pawl is positioned in front of the plug-in receptacle. A corresponding method is further described.

14 Claims, 6 Drawing Sheets

(56) References Cited

U.S. PATENT DOCUMENTS

| | | | | |
|---|---|---|---|---|
| 8,625,257 | B2* | 1/2014 | Schalk | H02B 1/056 |
| | | | | 361/652 |
| 9,312,668 | B2* | 4/2016 | Faber | H02B 1/14 |
| 9,564,741 | B1* | 2/2017 | Mittelstadt | H01H 71/08 |
| 9,762,038 | B2* | 9/2017 | Schroeder | H02B 11/24 |
| 10,250,017 | B2* | 4/2019 | Bastian | H01R 25/145 |
| 10,374,396 | B2 | 8/2019 | Schell et al. | |
| 10,855,059 | B2* | 12/2020 | Valsecchi | H01R 25/161 |
| 2017/0237238 | A1* | 8/2017 | Bastian | H01R 25/145 |
| | | | | 439/121 |

FOREIGN PATENT DOCUMENTS

| | | |
|---|---|---|
| EP | 2461440 A2 | 6/2012 |
| EP | 1864361 B1 | 12/2017 |
| EP | 3258588 B1 | 5/2019 |
| WO | WO-2017182033 A1 | 10/2017 |

OTHER PUBLICATIONS

German International Preliminary Report on Patentability issued in PCT/DE2020/100257, dated Mar. 16, 2021.

* cited by examiner

BUS BAR SYSTEM WITH AT LEAST ONE BUS BAR HELD IN A CONTACT PROTECTION HOUSING

CROSS-REFERENCE TO RELATED APPLICATIONS

This application is a U.S. National Phase application under 35 U.S.C. 371 of International Application No. PCT/DE2020/100257, filed on Mar. 30, 2020, which claims priority to German Patent Application No. 10 2019 109 629.4, filed on Apr. 11, 2019. The entire disclosures of the above applications are incorporated herein by reference in their entirety.

BACKGROUND

This section provides background information related to the present disclosure which is not necessarily prior art.

TECHNICAL FIELD

The invention is based on a bus bar system having at least one bus bar which is accommodated in a contact-protection housing protected against contact and accessible via contacting passages or electrical devices and/or device adapters, the contact-protection housing having a lower part and an upper part which is detachably fixed on the lower part and between which the at least one bus bar is held. Such a bus bar system is known from WO 2017/182033 A1. A similar system is also described in EP 1 864 361 B1 and EP 3 258 558 B1.

DISCUSSION

The bus bar systems known from the prior art have the disadvantage that they are comparatively complicated to handle, in particular during initial assembly and in the event of any subsequent modification of the bus bar system, for example if the bus bar system is extended and at least one bus bar has to be replaced by a bus bar of greater length. For the assembly, the lower part is mounted in a first step on the support, for example a mounting plate arranged vertically in the switch cabinet housing, so that the form-fit receptacles for the bus bars are freely accessible to the front side of the lower part. The bus bars can then be inserted into the form-fit receptacles and the upper part placed on the lower part so that the bus bars are accommodated between the upper and lower parts. The upper part and the lower part must then be aligned with each other in such a way that the corresponding screw passages of the upper and lower parts are aligned with each other and the upper part and the lower part can be screwed together using a plurality of screws. Only then is a secure fixing of the bus bars between the upper part and the lower part achieved. In particular, screwing the upper part onto the lower part with the bus bars inserted into the lower part and while maintaining the alignment of the upper part and the lower part with respect to each other often involves complications for a single person.

SUMMARY

This section provides a general summary of the disclosure, and is not a comprehensive disclosure of its full scope or all of its features.

It is therefore one aspect of the invention to further develop a bus bar system of the type described at the beginning in such a way that it permits both simple initial assembly and, moreover, also facilitates extension compared with the systems known from the prior art.

Accordingly, in a bus bar system, it is provided that the upper part has, on its side facing the lower part, a plurality of plug-in receptacles extending from the latter into the lower part, and the lower part has at least one slider with at least one and preferably a plurality of latching pawls which can be adjusted between a locking position, in which the at least one latching pawl engages in the plug-in receptacle, and a release position, in which the at least one latching pawl is positioned in front of the plug-in receptacle.

The bus bar system according to the invention differs functionally from the systems known from the prior art, in particular in that the upper part can be fixed to the lower part without tools and thus the at least one bus bar and preferably several of these can be held between the two parts. If the expected loads of the electrical devices suspended on the rail system via the at least one bus bar so require, then, if necessary, after locking the upper part to the lower parts in the manner described above, at least one screw connection can additionally be provided, via which at least the upper part can be screwed to the lower part and preferably the upper part can be screwed to the support, preferably a mounting plate, via the lower part.

The slider may have a plurality of latching pawls with their respective free ends pointing in a direction of advance of the slider from the release position to the locking position. The at least one latch may be L-shaped and may be fixed with a first, preferably the shorter, of its two sides to a straight slide plate of the slider. The slider may be inserted into the lower part via a groove of the lower part, which groove is open towards a mounting side of the lower part via which the lower part may be fixed to the support, in particular the mounting plate. On the other hand, the plug-in receptacles can project with their free ends into the groove, so that the latching pawls can be selectively inserted into the plug-in receptacles and withdrawn therefrom again by displacing the slider along the groove in or against the direction of advance.

When the at least one latch is L-shaped, it may have a wedge-shaped free end. In this case, the at least one L-shaped latch can have, on its longer side with the free end, a run-up slope which rises towards the shorter of the two sides of the latch. In this way, it is achieved that an increasing contact pressure is provided via the latch as the latch is pushed into the receptacle. Due to the L-shaped geometry, the latch can thereby provide a contact pressure under elastic deformation. A reproducible contact pressure can be achieved in conjunction with a stop of the slider, via which it comes into contact with the housing in the locking position.

In the release position of the slider, the latch can rest against a contact surface of the lower part via its rear side facing away from a tip of the free end. In this way, a defined setting position of the slider is provided for the haptic indication of the release position.

The at least one plug-in receptacle may have a V-shaped, a U-shaped or an O-shaped geometry in cross-section perpendicular to the direction of advance of the slider from the release position to the locking position. In principle, other geometries are also suitable which have a passage in the direction of advance of the slider for receiving the latch.

For each bus bar, the lower part can have a plurality of ribs opposing each other in pairs to form a passage for a bus bar at a distance apart, the passages being aligned with each other so that a bus bar extending through the passages is positively received in the passages. For a given mechanical strength of the ribs, the pairs of ribs may be of a number and spaced apart such that the ribs resist, substantially without distortion, an expected Lorenz force acting on the bus bar.

The lower part can have a hook element for each bus bar, which pre-fixes the respective bus bar to the lower part. This can further facilitate assembly, since the bus bars are already secured against falling out after insertion of the bus bars into the lower part and before the upper part is placed on the lower part. The hook elements may be in the form of plug-in elements which can be fixed to and removed from the lower part without the use of tools. For example, the hook elements can be detachably latched in a latching receptacle associated with the respective bus bar.

In this case, the hook elements can project into one of the contacting passages at least with a retaining blade projecting beyond the bus bar and be accommodated there in a form-fitting manner. In this way, the retaining blades are positioned in a defined manner in the longitudinal direction of the bus bar and, moreover, they do not obstruct the fitting of the upper part and also do not require a larger structural dimension of the contact protection housing. In particular, if the bus bar has a rectangular cross-section, it may be provided that it rests with one of its four perpendicular outer sides against the underside of the upper part facing the lower part.

In the locking position, the slider can extend essentially over the entire height of the contact protection housing and, in the release position, can protrude from the contact protection housing with a handle piece over an outer side of the contact protection housing extending parallel to the at least one bus bar. In this way, it is already visually apparent that the slider is in the release position and thus that the upper part is not or not completely secured relative to the lower part. The handle piece may further comprise a stop with which it rests against the outside in the locking position. In this way, the locking position is also defined so that excessive displacement of the slider from the release position beyond the locking position is effectively avoided.

In an area between adjacent bus bars, the upper part can have a recess, the bottom of which extends as far as a mounting side of the lower part, by means of which the lower part can be brought into contact with a support, preferably a mounting plate, the upper part being connected to the lower part and the support via a fastening means extending through the bottom and the mounting side into the support.

According to another aspect, a method for installing a bus bar system of the type previously described is proposed, comprising:
  Mounting of the lower part on a support, preferably on a vertical mounting plate;
  Inserting at least one bus bar into the lower part, the bus bar being received in the lower part in a form-fitting manner;
  Placing the upper part on the lower part and transferring the slider from the release position to the locking position, thereby securing the upper part to the lower part and thereby holding the bus bar between the upper part and the lower part.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Further details of the invention will be explained with reference to the figures below. Thereby showing.

DETAILED DESCRIPTION

Example embodiments will now be described more fully with reference to the accompanying drawings.

Figure 1:
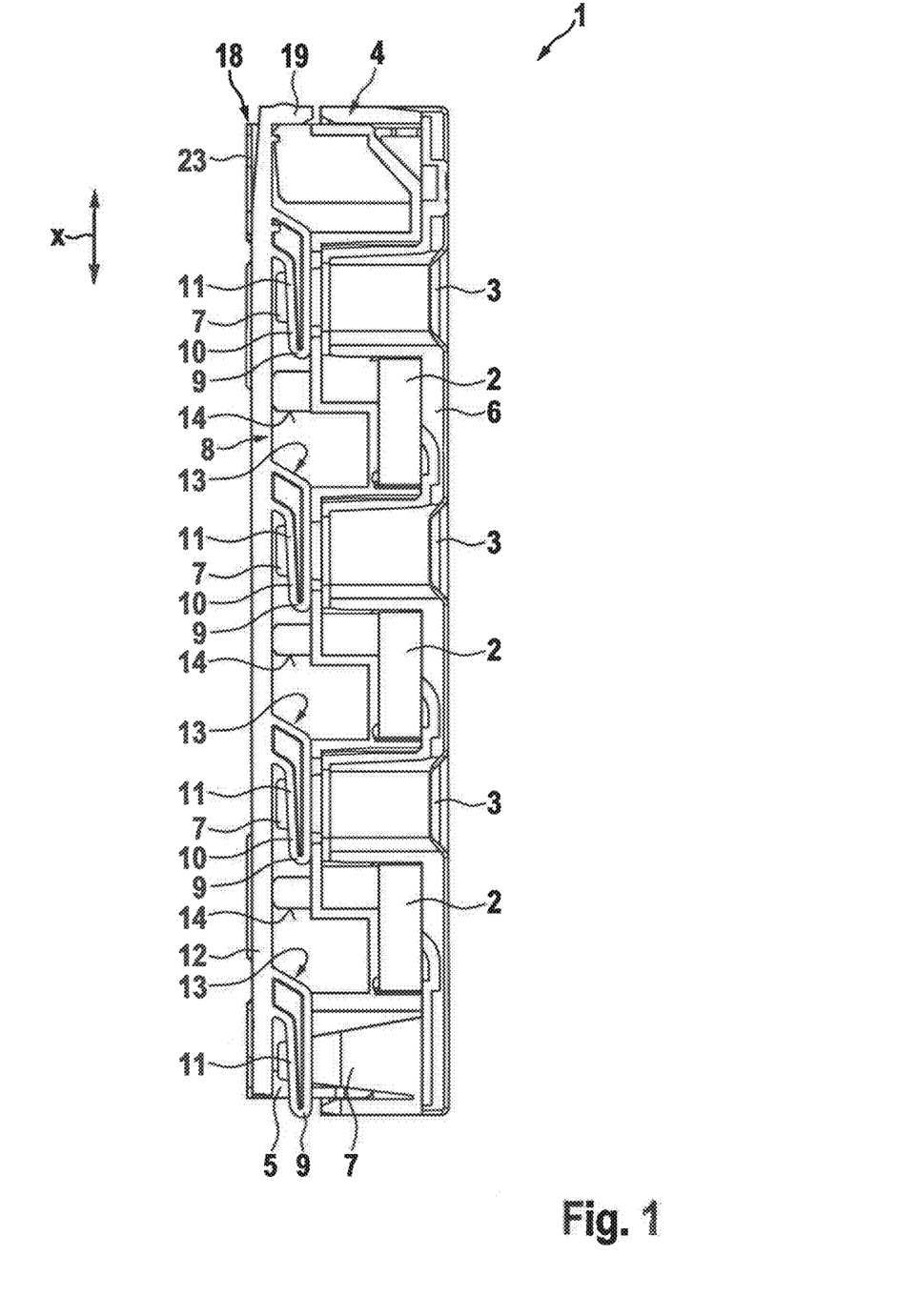
FIG. 1 cross-sectional view of an exemplary embodiment of a bus bar system according to the invention.

The cross-sectional view according to FIG. 1 shows an exemplary embodiment of a bus bar system 1, which essentially consists of a contact protection housing 4 in which three bus bars 2 are accommodated. The bus bars 2 are accessible from the front of the housing 4 via contacting passages 3, so that electrical devices and device adapters with hook-shaped retaining elements can engage behind the bus bars 2 via the contacting passages 3 after insertion.

Analogous to the bus bar system known from WO 2017/182033 A1, the contacting of the bus bars can be provided via a separate contact element of the devices or device adapters, so that the retaining elements passing through the passages 3 and engaging behind the bus bars 2 actually only have a retaining function. Suitable single-pole contact terminals are also described, for example, in EP 3 258 558 B1.

After the device or the component adaptor has been inserted into the housing 4 via the openings 3 through the upper part 6 of the housing, the device or the adaptor can be moved vertically downwards so that it engages behind the bus bars 2. In the embodiment shown in FIG. 1, the bus bar system has three poles and can thus be used, for example, for contacting three-pole component adaptors.

The housing 4 essentially comprises the aforementioned upper part 6 and a lower part 5, between which the bus bars 2 are accommodated, the upper part 6 being detachably connected to the lower part 5. For this purpose, it is provided that the upper part 6 has, on its side facing the lower part 5, a plurality of plug-in receptacles 7 extending from this side into the lower part 5. The plug-in receptacles 7 are V-shaped or taper towards their free end and have openings permeable in the direction of advance x of the slider 8. The slider 8 is inserted into the lower part 5 and has a plurality of catches 9. In the representation according to FIG. 1, the slider is arranged in the locking position in which the latching pawls 9 engage in the plug-in receptacle 7 and thus fix the upper part 6 to the lower part 5. In contrast, in a release position in which the slider 8 is displaced upwards with respect to the position shown in FIG. 1, the latching pawls 9 are located in front of the plug-in receptacles so that the upper part 6 can be lifted off the lower part 5 and thus the bus bars 2 are freely accessible and can be removed from the lower part 5 if necessary.

Figure 4:
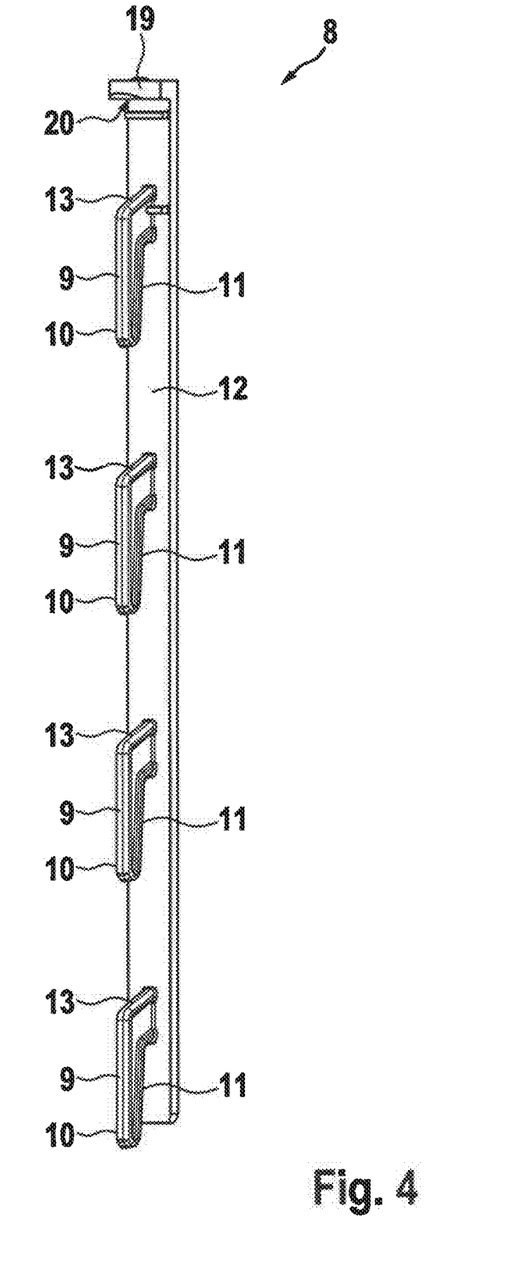
FIG. 4 an exemplary embodiment of a slider.

The detents 9 point with their respective free end 10 in the direction of advance x of the slider 8, along which the slider can be displaced from the release position to the locking position. The detents 9 are L-shaped and their shorter end is fixed to a straight slide plate 12. This is shown in detail in FIG. 4. The free end 10 of the detent pawls 9 is wedge-shaped, whereby the detent pawl 9 has a run-up slope 11 at its free end 10 which rises towards one of the shorter of the two sides of the L-shaped detent pawl 9. In the release position of the slider 8, the latch 9 rests via its rear side 13 facing away from the tip of the free end against an abutment surface 14 (see FIG. 1) of the lower part 5, so that a precise definition of the release position of the slider 8 is provided.

Figure 2:
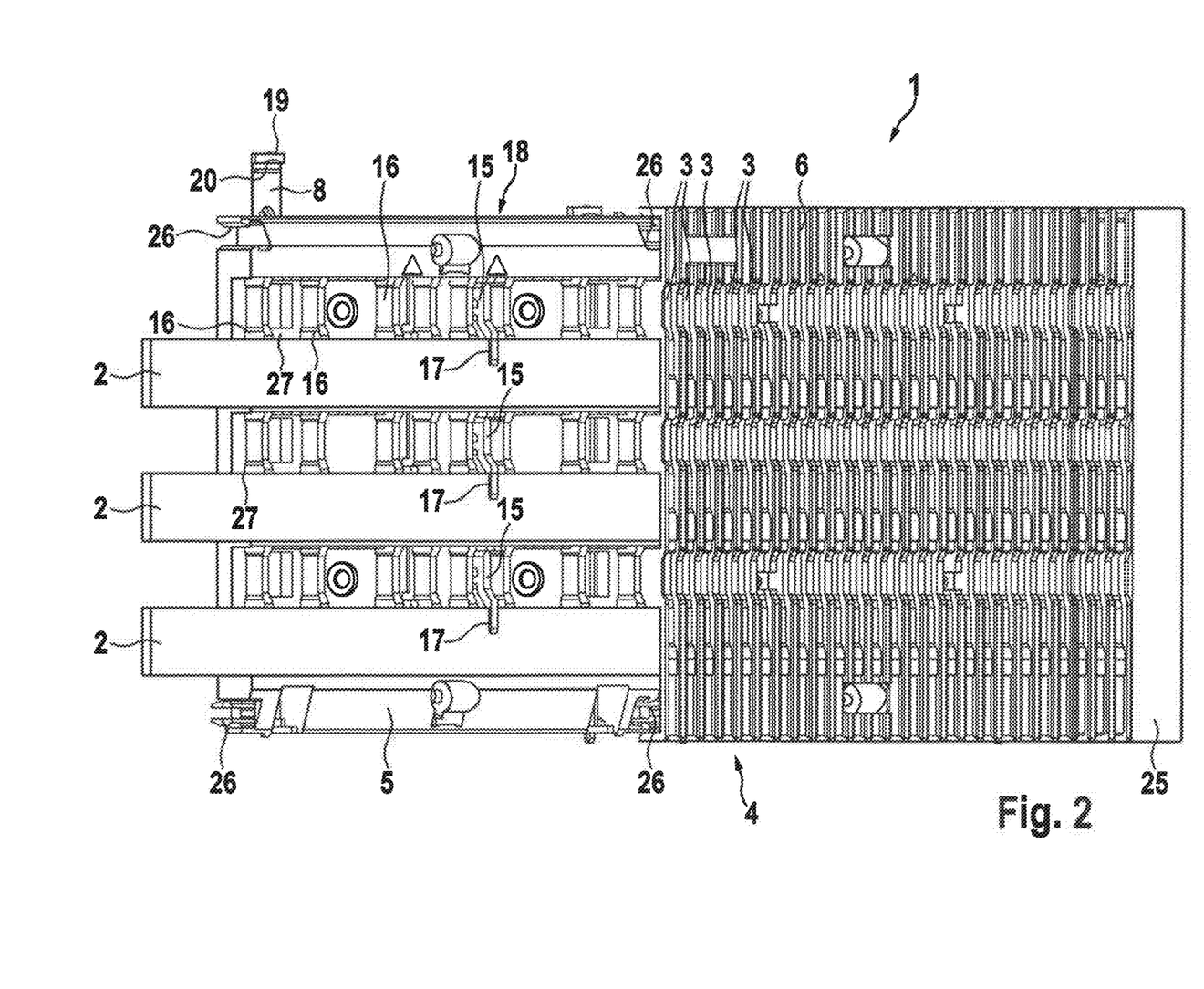
FIG. 2 perspective view of a further embodiment of a bus bar system according to the invention.
Figure 3:
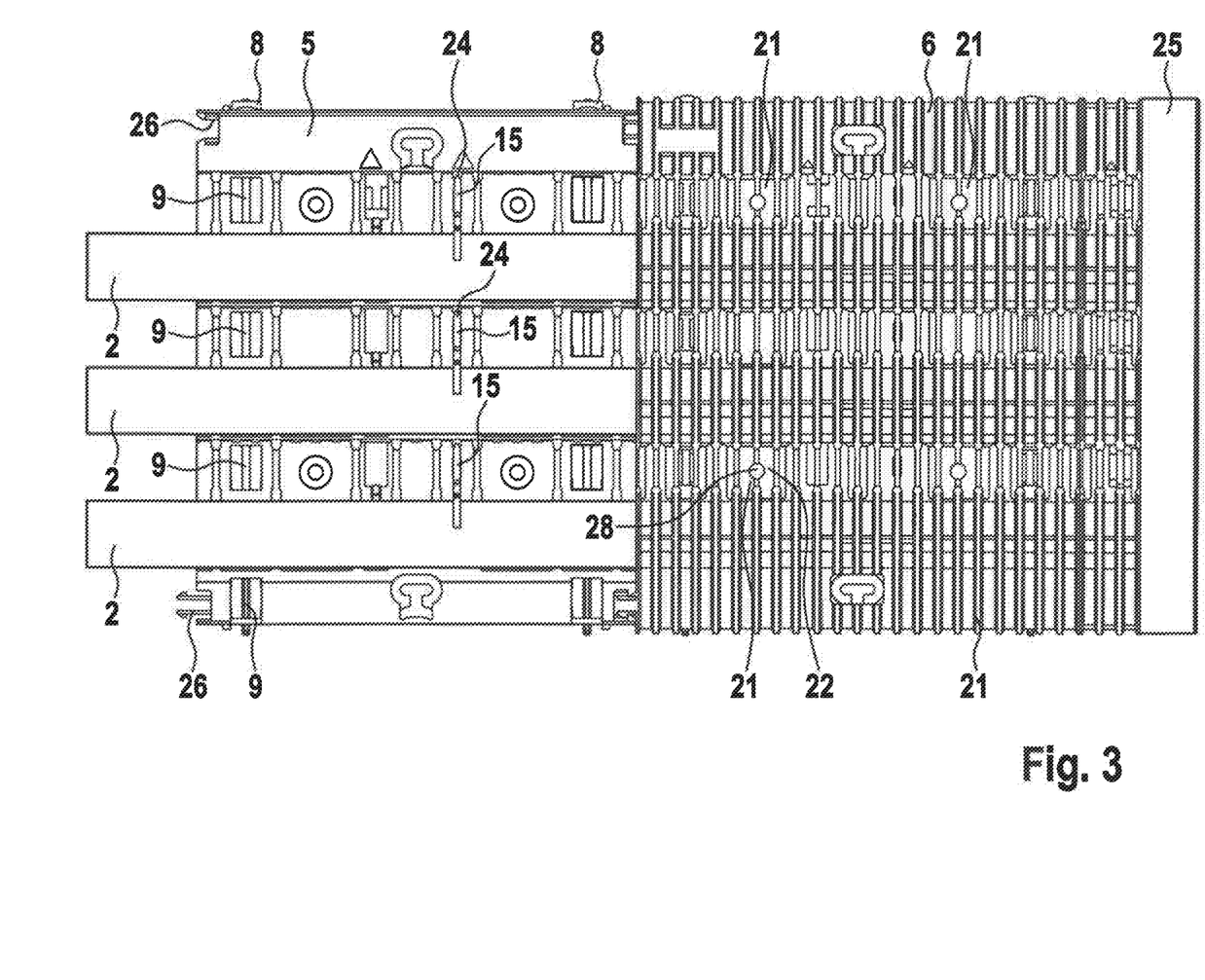
FIG. 3 a top view of the bus bar system according to FIG. 2.
Figure 5:
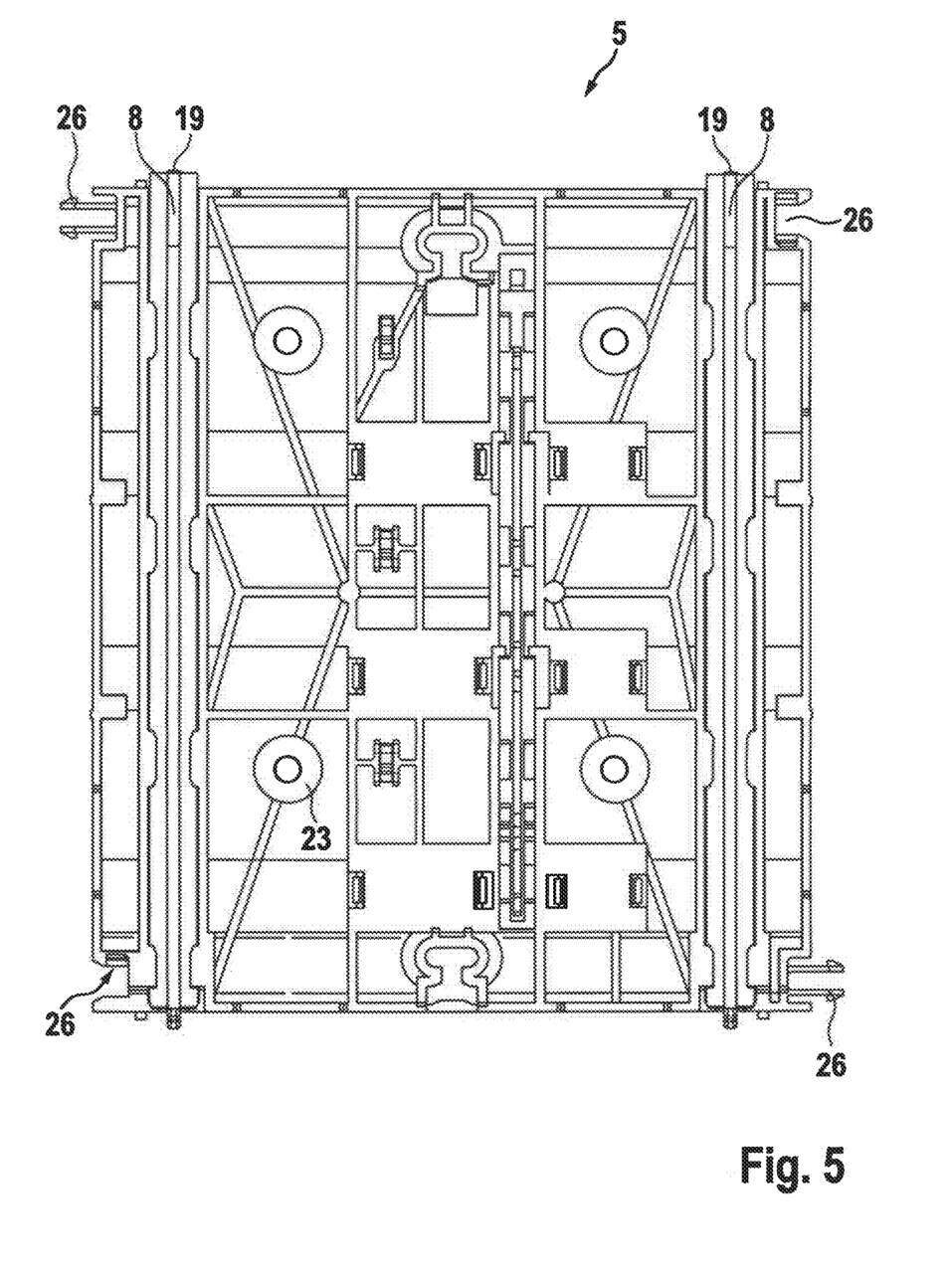
FIG. 5 top view of the rear side of a lower part according to an exemplary embodiment.

As shown in FIGS. 2 and 3, when the slider 8 is displaced from the release position (FIG. 2) to the locking position (FIG. 3), it may abut against an outer surface 18 of the housing 4 via its abutment 20, so that a precise definition of the locking position is also provided. FIGS. 2 and 3 further show that hook elements 15 may be provided to pre-fix the bus bars 2 to the lower part 5 when the upper part 6 is removed. For this purpose, after insertion of the bus bars 2 into the lower part 5, the hook elements 15 can be engaged in corresponding snap-in receptacles 24 in the lower part 5. The hook element 15 has a retaining blade 17 projecting beyond the bus bar 2, which, when the upper part 6 is placed on the lower part 5, can be positively received in one of the contacting passages 3 of the upper part 6, so that the hook elements 15 are on the one hand precisely arranged and on the other hand do not increase the overall height of the bus bar system 1. In an area between adjacent bus bars 2, the upper part 6 has a recess 21, the bottom 22 of which extends to a mounting side 23 (see FIG. 5) of the lower part 5, by means of which the lower part 5 can be brought into contact with a support, for example a mounting plate. The upper part 6 and the lower part 5 each have a bore 28, so that the upper part 6 can be connected to the lower part 5 and the support via a fastening means extending through the bores 28 in the base 22 and the mounting side 23 into the support.

The contact protection housing 4 is of modular design and has complementary snap-in connectors 26 at the opposite longitudinal ends, which allow the bus bar system to be extended as desired. At the end, an end cap 25 is provided which covers the free ends of the bus bars 2 in a contact-proof manner.

Figure 6:
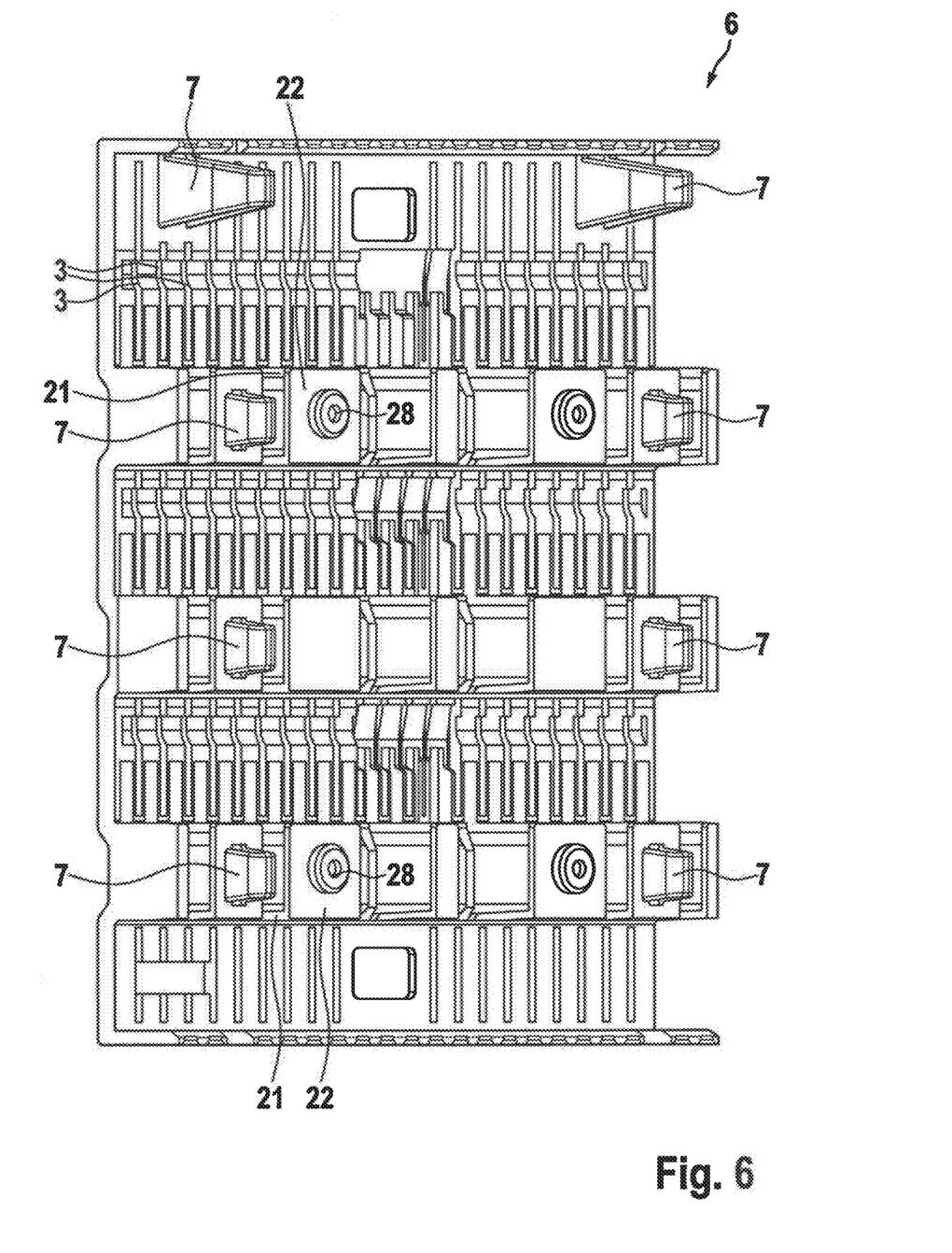
FIG. 6 perspective view of the rear side of an upper part according to an exemplary embodiment.

As shown in FIG. 6, the plug-in receptacles 7 on the underside of the upper part 6 may be in the form of V-shaped bodies integrally moulded on the upper part 6, the passage openings of which are aligned with one another and are permeable in the direction of advance x (compare FIG. 1) of the slide 8. Likewise, on the underside of the upper part 6, the recesses 21 protrude beyond their bottom sides 25 with the bore 28 in order to reach the mounting side 23 of the lower part 5 when the upper part 6 is mounted on the lower part 5 (compare FIG. 1).

The features of the invention disclosed in the foregoing description, in the drawings as well as in the claims may be essential to the realization of the invention either individually or in any combination.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A bus bar system having at least one bus bar which is accommodated in a contact protection housing protected against contact and accessible via contacting passages for electrical devices and/or device adapters, the contact-protection housing having a lower part and an upper part which is detachably fixed on the lower part and between which the at least one bus bar is held, wherein the upper part has, on its side facing the lower part, a plurality of plug-in receptacles extending from the latter into the lower part, and the lower part has at least one slider with at least one latching pawl which can be adjusted between a locking position, in which the at least one latching pawl engages in a corresponding one of the plug-in receptacles, and a release position, in which the at least one latching pawl is positioned in front of the corresponding one of the plug-in receptacles, wherein the lower part comprises, for each bus bar, a hook element which pre-fixes the respective bus bar to the lower part.

2. The bus bar system according to claim 1, wherein said slider comprises a plurality of said latching pawls having their respective free ends pointing in an advancing direction (x) of said slider from said releasing position to said locking position.

3. The bus bar system according to claim 1, wherein the at least one latching pawl is L-shaped and is fixed with a first, preferably the shorter, of its two sides to a straight slider plate of the slider.

4. The bus bar system according to claim 1, wherein the at least one latching pawl is L-shaped and has a wedge-shaped free end.

5. The bus bar system according to claim 3, wherein the at least one L-shaped latching pawl has on its longer side with the free end a run-up slope rising towards the shorter of the two sides of the latch.

6. The bus bar system according to claim 3, in which, in the release position of the slider, the latching pawl rests against an abutment surface of the lower part via its rear side facing away from a tip of the free end.

7. The bus bar system according to claim 1, wherein the corresponding one of the plug-in receptacles has a U-shaped or O-shaped geometry in cross-section perpendicular to an advancement direction (x) of the slider from the release position to the locking position.

8. The bus bar system according to claim 1, in which the lower part has, for the at least one bus bar, a plurality of ribs—which face one another in pairs, forming a passage for the at least one bus bar, at a distance apart, the passages being aligned with one another so that the at least one one bus bar extending through the respective passages is positively received in the respective passage, wherein, for a given mechanical strength of the ribs, the pairs of ribs have a number and spacing from each other selected such that the ribs resist, substantially without distortion, an expected Lorenz force acting on the bus bar.

9. The bus bar system according to claim 1, wherein the hook element is releasably latched in a latching receptacle associated with the respective bus bar.

10. The bus bar system according to claim 1, wherein the hook element projects into one of the contacting passages at least with a retaining blade projecting beyond the bus bar and is positively received therein.

11. The bus bar system according to claim 1, wherein in the locking position the slider extends substantially over the entire height of the contact protection housing and in the release position protrudes from the contact protection housing with a handle piece over an outer side of the contact protection housing extending parallel to the at least one bus bar.

12. The bus bar system according to claim 11, wherein the handle piece comprises a stop with which it abuts the outer side in the locking position.

13. The bus bar system according to claim 1, wherein the at least one bus bar includes adjacent bus bars in which, in a region between the adjacent bus bars, the upper part has a recess, the bottom of which extends as far as a mounting side of the lower part, with which the lower part can be brought to rest on a support, preferably on a mounting plate, the upper part being connected to the lower part and the support via a fastening means extending through the bottom and the mounting side into the support.

14. A method for the installation of the bus bar system according to claim 1, comprising:
  Mounting the lower part on a support, preferably on a vertical mounting plate;
  Inserting the at least one bus bar into the lower part, wherein the bus bar is positively received in the lower part; —
    Placing the upper part on the lower part and transferring the slider from the release position to the locking position, whereby the upper part is fixed to the lower part and thereby the bus bar is held between the upper part and the lower part,
    wherein after the insertion of the at least one bus bar into the lower part and before the upper part is placed on the lower part, the bus bar is prefixed to the lower part with a hook element.

\* \* \* \* \*